United States Patent
Kasai et al.

(10) Patent No.: US 11,875,253 B2
(45) Date of Patent: Jan. 16, 2024

(54) LOW-RESOURCE ENTITY RESOLUTION WITH TRANSFER LEARNING

(71) Applicant: International Business Machines Corporation, Armonk, NY (US)

(72) Inventors: Jungo Kasai, Seattle, WA (US); Kun Qian, San Jose, CA (US); Sairam Gurajada, San Jose, CA (US); Yunyao Li, San Jose, CA (US); Lucian Popa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 16/443,024

(22) Filed: Jun. 17, 2019

(65) Prior Publication Data

US 2020/0394511 A1     Dec. 17, 2020

(51) Int. Cl.
*G06N 3/08*     (2023.01)
*G06N 3/044*    (2023.01)

(52) U.S. Cl.
CPC ............... *G06N 3/08* (2013.01); *G06N 3/044* (2023.01)

(58) Field of Classification Search
CPC ............................. G06N 3/08; G06N 3/0445
See application file for complete search history.

(56) References Cited

U.S. PATENT DOCUMENTS

| 8,611,505 B2 | 12/2013 | Oppenheim et al. |
| 8,949,241 B2 | 2/2015 | Olof-Ors et al. |
| 9,063,926 B2 | 6/2015 | Crestani Campos et al. |
| 9,189,473 B2 | 11/2015 | Galle et al. |
| 9,535,902 B1 | 1/2017 | Michalak et al. |

(Continued)

FOREIGN PATENT DOCUMENTS

| CN | 104573130 A1 | 4/2015 |
| CN | 105260746 A | 1/2016 |

(Continued)

OTHER PUBLICATIONS

Koudas et al., "Record linkage: similarity measures and algorithms," in Sigmod. ACM, 2006, pp. 802-803.

(Continued)

*Primary Examiner* — Douglas Godbold
*Assistant Examiner* — Edward Tracy, Jr.
(74) *Attorney, Agent, or Firm* — Ryan, Mason & Lewis, LLP

(57) ABSTRACT

Methods, systems, and computer program products for low-resource entity resolution with transfer learning are provided herein. A computer-implemented method includes processing input data via a first entity resolution model, wherein the input data comprise labeled input data and unlabeled input data; identifying one or more portions of the unlabeled input data to be used in training a neural network entity resolution model, wherein said identifying comprises applying one or more active learning algorithms to the first entity resolution model; training, using (i) the one or more portions of the unlabeled input data and (ii) one or more deep learning techniques, the neural network entity resolution model; and performing one or more entity resolution tasks by applying the trained neural network entity resolution model to one or more datasets.

16 Claims, 7 Drawing Sheets

(56) References Cited

U.S. PATENT DOCUMENTS

| | | | |
|---|---|---|---|
| 9,652,452 B2 | 5/2017 | Iverson | |
| 9,678,957 B2 | 6/2017 | Cormack et al. | |
| 9,734,207 B2 | 8/2017 | Goeppinger | |
| 10,169,331 B2 | 1/2019 | Baron-Palucka et al. | |
| 10,180,969 B2 | 1/2019 | Trudel et al. | |
| 10,303,771 B1 | 5/2019 | Jezewski | |
| 2003/0191625 A1 | 10/2003 | Gorin et al. | |
| 2013/0185314 A1 | 7/2013 | Rubinstein et al. | |
| 2013/0317806 A1 | 11/2013 | Crestani Campos et al. | |
| 2015/0269494 A1 | 9/2015 | Kardes et al. | |
| 2016/0012020 A1 | 1/2016 | George et al. | |
| 2016/0328386 A1* | 11/2016 | Cross, III | G06F 40/30 |
| 2016/0378765 A1 | 12/2016 | Bernstein et al. | |
| 2017/0032249 A1 | 2/2017 | Chougule et al. | |
| 2017/0075918 A1 | 3/2017 | Bates-Haus et al. | |
| 2017/0098013 A1 | 4/2017 | Shirwadkar et al. | |
| 2017/0255952 A1* | 9/2017 | Zhang | G06Q 10/06395 |
| 2018/0011837 A1 | 1/2018 | Beller et al. | |
| 2018/0121500 A1 | 5/2018 | Reschke et al. | |
| 2018/0144003 A1 | 5/2018 | Formoso et al. | |
| 2018/0232601 A1 | 8/2018 | Feng et al. | |
| 2018/0314729 A9 | 11/2018 | Reschke et al. | |
| 2018/0330280 A1* | 11/2018 | Erenrich | G06N 20/00 |
| 2019/0171944 A1* | 6/2019 | Lu | G06N 20/00 |
| 2019/0188212 A1* | 6/2019 | Miller | G06N 7/005 |
| 2019/0251172 A1 | 8/2019 | Jezewski et al. | |
| 2019/0318261 A1* | 10/2019 | Deng | G06N 3/0454 |
| 2019/0361961 A1* | 11/2019 | Zambre | G06F 16/2365 |
| 2020/0202210 A1* | 6/2020 | Kushnir | G06N 3/08 |
| 2020/0252600 A1* | 8/2020 | Tseng | G06N 3/088 |
| 2021/0056388 A1* | 2/2021 | Karg | G06N 3/082 |

FOREIGN PATENT DOCUMENTS

| | | |
|---|---|---|
| CN | 107210035 A | 9/2017 |
| GB | 2536898 A | 10/2016 |
| WO | 2009086311 A1 | 7/2009 |
| WO | 2018077401 A1 | 5/2018 |

OTHER PUBLICATIONS

D. Angluin. 1988. Queries and Concept Learning. Machine Learning (1988), 319-342.

S. Bach, M. Broecheler, B. Huang, and L. Getoor. 2015. Hinge-Loss Markov Random Fields and Probabilistic Soft Logic. CoRR (2015). arXiv:abs/1505.04406 .

A. Beygelzimer, J. Langford, T. Zhang, and D. Hsu. 2010. Agnostic Active Learning Without Constraints. In NIPS. 199-207.

M. Bilenko, B. Kamath, and R. Mooney. 2006. Adaptive blocking: Learning to scale up record linkage. In Workshop on Information Integration on the Web. 87-96.

S. Dasgupta and D. Hsu. 2008. Hierarchical Sampling for Active Learning. In ICML. 208-215.

G. Demartini, D. Difallah, and P. Cudre-Mauroux. 2013. Large-scale Linked Data Integration using Probabilistic Reasoning and Crowdsourcing. VLDB Journal (2013), 665-687.

X. Dong, A. Halevy, and J. Madhavan. 2005. Reference Reconciliation in Complex Information Spaces. In SIGMOD. 85-96.

B. Efron and R. Tibshirani. 1993. An Introduction to the Bootstrap. Chapman & Hall.

I. Fellegi and A. Sunter. 1969. A Theory for Record Linkage. J. Amer. Statist. Assoc. (1969), 1183-1210.

J. Fisher, P. Christen, and Q. Wang. 2016. Active Learning Based Entity Resolution using Markov Logic. In PAKDD.

Y. Freund, H. Seung, E. Shamir, and N. Tishby. 1997. Selective sampling using the query by committee algorithm. Machine Learning (1997), 133-168.

L. Getoor and A. Machanavajjhala. 2013. Entity Resolution for Big Data.

O. Goga, P. Loiseau, R. Sommer, R. Teixeira, and K. Gummadi. 2015. On the reliability of profile matching across large online social networks. In KDD. 1799-1808.

M. Hernández, G. Koutrika, R. Krishnamurthy, L. Popa, and R. Wisnesky. 2013. HIL: A High-level Scripting Language for Entity Integration. In EDBT. 549-560.

M. Hernandez and S. Stolfo. 1995. The Merge/Purge Problem for Large Databases. In SIGMOD. 127-138.

Matti Kääriäinen. 2006. Active Learning in the Non-realizable Case. 63-77.

A. Khan and H. Garcia-Molina. 2016. Attribute-based Crowd Entity Resolution. In CIKM. 549-558.

S. Kok and P. Domingos. 2010. Learning Markov logic networks using structural motifs. In ICML. 551-558.

H. Köpcke and E. Rahm. 2008. Training selection for tuning entity matching. In QDB/MUD. 3-12.

M. Michelson and C. Knoblock. 2006. Learning Blocking Schemes for Record Linkage. In AAAI. 440-445.

M. Motoyama and G. Varghese. 2009. I seek you: Searching and matching individuals in social networks. In Workshop on Web Information and Data Management. 67-75.

M. Richardson and P. Domingos. 2006. Markov logic networks. Machine Learning Journal (2006), 107-136.

H. Seung, M. Opper, and H. Sompolinsky. 1992. Query by committee. In COLT. 287-294.

P. Singla and P. Domingos. 2006. Entity Resolution with Markov Logic. In ICDM. 572-582.

V. Vapnik. 1995. The Nature of Statistical Learning Theory. Springer-Verlag.

V. Verroios and H. Garcia-Molina. 2015. Entity Resolution with Crowd Errors. In ICDE. 219-230.

N. Vesdapunt, K. Bellare, and N. Dalvi. 2014. Crowdsourcing algorithms for entity resolution. In VLDB. 1071-1082.

J. Wang, T. Kraska, M. Franklin, and J. Feng. 2012. CrowdER: Crowdsourcing Entity Resolution. PVLDB (2012), 1483-1494.

S. Whang, P. Lofgren, and H. Garcia-Molina. 2013. Question Selection for Crowd Entity Resolution. In VLDB. 349-360.

G. You, S. Hwang, Z. Nie, and J. Wen. 2011. SocialSearch: Enhancing Entity Search with Social Network Matching. In EDBT. 515-519.

Peter Mell, et al. The NIST Definition of Cloud Computing, Recommendations of the National Institute of Standards and Technology, US Department of Commerce, Special Publicaiton 800-145, Sep. 2011, pp. 1-7.

Qian, Kun. Discovering Information Integration Specifications from Data Examples, UC Santa Cruz, US Santa Cruz Electronic Theses and Dissertations, https://escholarship.org/uc/item/3271w6hm, 2017, pp. 1-216.

List of IBM Patents or Patent Applications Treated as Related, Aug. 10, 2020, pp. 1-2.

Nadeau, David, "Semi-Supervised Named Entity Recognition: Learning to Recognize 100 Entity Types with Little Supervision," Thesis, University of Ottawa, 2007.

Thompson et al., "The BioLexicon: A Large-Scale Terminological Resource for Biomedical Text Mining," BMC Bioinformatics 12.1 (2011):397.

Arasu et al., 2009. A grammar-based entity representation framework for data cleaning. In Proceedings of the 2009 ACM SIGMOD International Conference on Management of data, pp. 233-244. ACM.

Arasu et al., 2008. Transformation-based framework for record matching. In Data Engineering, 2008. ICDE 2008. IEEE 24th International Conference on, pp. 40-49. IEEE.

Arasu et al., 2009. Learning string transformations from examples. Proceedings of the VLDB Endowment, 2:514-525.

Auer et al., 2007. Dbpedia: A nucleus for a web of open data. In The semantic web, pp. 722-735. Springer.

Bartoli et al., 2012. Automatic generation of regular expressions from examples with genetic programming. In Proceedings of the 14th annual conference companion on Genetic and evolutionary computation, pp. 1477-1478. ACM.

Berant et al., 2013. Semantic parsing on freebase from question-answer pairs. In EMNLP, vol. 2, p. 6.

Steven Bethard. 2013. A synchronous context free grammar for time normalization. In EMNLP, pp. 821-826.

(56) References Cited

OTHER PUBLICATIONS

Bollacker et al., 2008. Freebase: a collaboratively created graph database for structuring human knowledge. In Proceedings of the 2008 ACM SIGMOD international conference on Management of data, pp. 1247-1250. ACM.

Carlson et al., 2010. Toward an architecture for never-ending language learning. In AAAI, vol. 5, p. 3.

Peter Christen. 2012. A survey of indexing techniques for scalable record linkage and deduplication. IEEE transactions on knowledge and data engineering, 24(9):1537-1555.

Culotta et al., 2005. Reducing labeling effort for structured prediction tasks. In AAAI, vol. 5, pp. 746-751.

Dredze et al., 2010. Entity disambiguation for knowledge base population. In COLING.

D'Souza et al., 2015. Sieve-based entity linking for the biomedical domain. In ACL (2), pp. 297-302.

Elmagarmid et al., 2007. Duplicate record detection: A survey. IEEE Transactions on knowledge and data engineering, 19(1):1-16.

Fader et al., 2011. Identifying relations for open information extraction. In Proceedings of the Conference on Empirical Methods in Natural Language Processing, pp. 1535-1545. Association for Computational Linguistics.

Finkel et al., 2009. Nested named entity recognition. In Proceedings of the 2009 Conference on Empirical Methods in Natural Language Processing: vol. 1-vol. 1, pp. 141-150. Association for Computational Linguistics.

Galarraga et al., 2014. Canonicalizing open knowledgebases. In Proceedings of the 23rd ACM International Conference on Conference on Information and Knowledge Management, pp. 1679-1688. ACM.

Halevy et al., 2016. Discovering structure in the universe of attribute names. In Proceedings of the 25th International Conference on World Wide Web, pp. 939-949. International World Wide Web Conferences Steering Committee.

Han et al., 2011. Collective entity linking in web text: a graph-based method. In Proceedings of the 34th international ACM SIGIR conference on Research and development in Information Retrieval, pp. 765-774. ACM.

Hoffmann et al., 2011. Knowledge-based weak supervision for information extraction of overlapping relations. In Proceedings of the 49th Annual Meeting of the Association for Computational Linguistics: Human Language Technologies—vol. 1, pp. 541-550. Association for Computational Linguistics.

Lee et al., 2014. Context-dependent semantic parsing for time expressions. In ACL (1), pp. 1437-1447.

Lehmann et al., 2010. Lcc approaches to knowledgebase population at tac 2010. In TAC.

Li et al., 2008. Regular expression learning for information extraction. In Proceedings of the Conference on Empirical Methods in Natural Language Processing, pp. 21-30. Association for Computational Linguistics.

Xiao Li. 2010. Understanding the semantic structure of noun phrase queries. In Proceedings of the 48th Annual Meeting of the Association for Computational Linguistics, pp. 1337-1345. Association for Computational Linguistics.

Liu et al., 2013. Entity linking for tweets. In ACL (1), pp. 1304-1311.

McCallum et al., 2000. Efficient clustering of high-dimensional data sets with application to reference matching. In Proceedings of the sixth ACM SIGKDD international conference on Knowledge discovery and data mining, pp. 169-178. ACM.

Nakashole et al., 2011. Scalable knowledge harvesting with high precision and high recall. In Proceedings of the fourth ACM international conference on Web search and data mining, pp. 227-236. ACM.

Qian et al., 2017. Active learning for large-scale entity resolution. In Proceedings of the 2017 ACM on Conference on Information and Knowledge Management, CIKM '17, pp. 1379-1388, New York, NY, USA. ACM.

Qian et al., 2018. Lustre: An interactive system for entity structured representation and variant generation. In Data Engineering (ICDE), 2018 IEEE 34th International Conference on. IEEE.

Riedel et al., 2010. Modeling relations and their mentions without labeled text. In Joint European Conference on Machine Learning and Knowledge Discovery in Databases, pp. 148-163. Springer.

Settles et al., 2008. An analysis of active learning strategies for sequence labeling tasks. In Proceedings of the conference on empirical methods in natural language processing, pp. 1070-1079. Association for Computational Linguistics.

Shen et al., 2015. Entity linking with a knowledge base: Issues, techniques, and solutions. IEEE Transactions on Knowledge and Data Engineering, 27(2):443-460.

Singh et al., 2012. Learning semantic string transformations from examples. Proceedings of the VLDB Endowment, 5:740-751.

Ace 2005 multilingual training corpus. Linguistic Data Consortium, Philadelphia, 2006.

Xu et al., 2013. Filling knowledge base gaps for distant supervision of relation extraction. In ACL (2), pp. 665-670.

Zhang et al., 2010. Nus-i2r: Learning a combined system for entity linking. In TAC.

Zheng et al., 2010. Learning to link entities with knowledgebase. In Human Language Technologies: The 2010 Annual Conference of the North American Chapter of the Association for Computational Linguistics, pp. 483-491. Association for Computational Linguistics.

SAP, SAP HANA Variant Generation, https://help.sap.com/viewer/650b1af302924b3d85ec109e325edf93/2.0.00/en-US/57b1fcc36d6d1014b3fc9283b0e91070.html, 2017.

Johannes Hoffart, Fabian M Suchanek, Klaus Berberich, and Gerhard Weikum. 2013. YAGO2: A spatially and temporally enhanced knowledge base from Wikipedia. Artificial Intelligence 194 (2013), 28-61.

David D Lewis and Jason Catlett. 1994. Heterogeneous uncertainty sampling for supervised learning. In Machine Learning Proceedings 1994. Elsevier, 148-156.

Arasu et al. On Active Learning of Record Matching Packages. In SIGMOD 2010.

S. Sarawagi and A. Bhamidipaty. 2002. Interactive Deduplication Using Active Learning. In KDD. 269-278.

J. de Freitas, G. Pappa, A. da Silva, M. Gonc,alves, E. Moura, A. Veloso, A. Laender, M. de Carvalho. 2010. Active Learning Genetic programming for record deduplication. In IEEE Congress on Evolutionary Computation. 1-8.

R. Isele and C. Bizer. 2013. Active Learning of Expressive Linkage Rules using Genetic Programming. Web Semantics: Science, Services and Agents on the World Wide Web (2013), 2-15.

S. Tejada, C. Knoblock, and S. Minton. 2001. Learning Object Identification Rules for Information Integration. Information Systems (2001), 607-633.

P. Christen, D. Vatsalan, and Q. Wang. 2015. Efficient Entity Resolution with Adaptive and Interactive Training Data Selection. In ICDM. 1550-4786.

G. Dal Bianco, R. Galante, M. Gonsalves, S. Canuto, and C. Heuser. 2015. A Practical and Effective Sampling Selection Strategy for Large Scale Deduplication. IEEE TKDE (2015), 2305-2319.

K. Bellare, S. Lyengar, A. Parameswaran, and V. Rastogi. KDD 2012. Active Sampling for Entity Matching.

Kooli et al., "Deep Learning Based Approach for Entity Resolution in Databases", Research Gate, Jan. 2018.

Mudgal et al. Deep Learning for Entity Matching: A design Space exploration. SIGMOD 2018.

Ebraheem et al. Distributed Representations of Tuples for Entity Resolution. VLDB 2018.

Qian et al., Active Learning for Large-Scale Entity Resolution. CIKM 2017.

Christen et al., 2015. Efficient Entity Resolution with Adaptive and Interactive Training Data Selection. In ICDM. 1550-4786.

Konda et al., 2016. Magellan: Toward building entity matching management systems. VLDB9:1197-1208.

Arasu et al., 2010. On active learning of record matching packages. In SIGMOD.

(56) References Cited

OTHER PUBLICATIONS

Bilenko et al., 2003. Adaptive duplicate detection using learnable string similarity measures. In KDD, 39-48. New York, NY, USA: ACM.

Bird et al., 2009. Natural Language Processing with Python. OReilly Media.

Bojanowski et al., 2017. Enriching word vectors with subword information. TACL 5:135-146.

Chen et al., 2018. Big gorilla: an open-source ecosystem for data preparation and integration. IEEE Data Engineering Bulletin, Special Issue on Data Integration.

Cho et al., 2014. Learning phrase representations using rn encoder-decoder for statistical machine translation. In EMNLP.

Christen, P. 2008. Febrl: A freely available record linkage system with a graphical user interface. In Proceedings of the Second Australasian Workshop on Health Data and Knowledge Management—vol. 80, HDKM '08, 17-25.

Das et al., 2016. The Magellan data repository. https://sites.google.com/site/anhaidgroup/useful-stuff/data.

de Freitas et al., 2010. Active learning genetic programming for record deduplication. IEEE Congress on Evolutionary Computation 1-8.

Dong et al., 2005. Reference reconciliation in complex information spaces. In SIGMOD, 85-96. New York, NY, USA: ACM.

Elman, J. L. 1990. Finding structure in time. Cognitive Science 14:179-211.

Fagin et al., 2009. Clio: Schema mapping creation and data exchange. In Conceptual Modeling: Foundations and Applications.

Fellegi et al., 1969. "A theory for record linkage," Journal of the American Statistical Association, vol. 64, No. 328, pp. 1183-1210, 1969.

Ganin et al., 2015. Unsupervised domain adaptation by backpropagation. Proceedings of the 32nd International Conference on Machine Learning, vol. 37 of Proceedings of Machine Learning Research, 1180-1189.

Hernandez et al., 1995. The merge/purge problem for large databases. In SIGMOD, 127-138. New York, NY, USA.

Hochreiter et al., 1997. Long short-term memory. Neural Computation 9:1735-1780.

Isele et al., 2012. Learning of expressive linkage rules using genetic programming. Proceedings of the VLDB Endowment, vol. 5, No. 11.

Isele et al., 2013. Active learning of expressive linkage rules using genetic programming. Journal of Web Semantics.

Kingma et al., 2015. ADAM: A Method for Stochastic Optimization. In ICLR.

Kopcke et al., 2010. Evaluation of entity resolution approaches on real-world match problems. VLDB.

Kremer et al., 2014. Active learning with support vector machines. Wiley Interdisc. Rew.: Data Mining and Knowledge Discovery 4:313-326.

Paszke et al., 2017. Automatic differentiation in pytorch. In NIPS 2017 Autodiff Workshop.

Pennington et al., 2014. Glove: Global vectors for word representation. In EMNLP.

Rahm et al., 2001. A survey of approaches to automatic schema matching. VLDB Journal 10:334-350.

Sarawagi et al., 2002. Interactive deduplication using active learning. In KDD.

Srivastava et al., 2015. Training very deep networks. In NIPS.

Tejada et al., 2001. Learning object identification rules for information integration. Inf. Syst. 26:607-633.

Wang et al., 2011. Entity matching: How similar is similar. VLDB 4(10):622-633.

Wang et al., 2017. Cost-effective active learning for deep image classification. IEEE Trans. Cir. and Sys. for Video Technol. 27(12):2591-2600.

\* cited by examiner

302

| Deep Transfer Active Learning |
|---|

Input:
    Unlabeled data $D^U$, sampling size $K$, batch size $B$, max. iteration number $T$, max. number of epochs $I$.

Notification:
    Denote the deep ER parameters and the set of labeled samples by $W$ and $D^L$ respectively. Update($W$, $D^L$, $B$) denotes a parameter update function the optimizes the negative log-likelihood of the labeled data $D^L$ with batch size $B$. Set $k = K/2$.

1: Initialize $W$ via transfer learning. Initialize also $D^L = \emptyset$
2: for $t \in \{1, 2, ..., T\}$ do
3:    Select $k$ likely false positives and $k$ likely false negatives from $D^U$ based on eq. 1 and remove them from $D^U$. Label those samples and add them to $D^L$.
4:    Select $k$ high-confidence positives and $k$ high-confidence negatives from $D^U$ using eq. 2 and add them with positive and negative labels to $D^L$.
5:    for $t \in \{1, 2, ..., I\}$ do
6:      $W \leftarrow$ Update($W$, $D^L$, $B$)
7:      Run deep ER model on $D^L$ with $W$ and get the F1 score.
8:      if the F1 score improves then
9:        $W_{best} \leftarrow W$
10:     end if
11:    end for
12:    $W \leftarrow W_{best}$
13: end for
14: return $W$

FIG. 3

LOW-RESOURCE ENTITY RESOLUTION WITH TRANSFER LEARNING

FIELD

The present application generally relates to information technology and, more particularly, to data management techniques.

BACKGROUND

Entity resolution (ER) techniques identify records in data collections that refer to the same entity, and such techniques are commonly utilized in data cleaning and integration processes. Conventional ER approaches often require expensive manual feature engineering to explicitly define matching functions that apply to the attributes of the entities in question. Additionally, conventional ER approaches can also require large amounts of labeled data, which are often unavailable in real-world applications.

SUMMARY

In one embodiment of the present invention, techniques for low-resource entity resolution with transfer learning are provided. An exemplary computer-implemented method can include processing input data via a first entity resolution model, wherein the input data include labeled input data and unlabeled input data, and identifying one or more portions of the unlabeled input data to be used in training a neural network entity resolution model, wherein identifying includes applying one or more active learning algorithms to the first entity resolution model. The method also includes training, using (i) the one or more portions of the unlabeled input data and (ii) one or more deep learning techniques, the neural network entity resolution model, and performing one or more entity resolution tasks by applying the trained neural network entity resolution model to one or more datasets.

In another embodiment of the invention, an exemplary computer-implemented method can include processing input data via a randomly initialized entity resolution model, wherein the input data include unlabeled input data, and identifying one or more portions of the unlabeled input data to be used in training the randomly initialized entity resolution model, wherein identifying includes applying one or more active learning algorithms to the randomly initialized entity resolution model. Additionally, such a method includes training, using (i) the one or more portions of the unlabeled input data and (ii) one or more deep learning techniques, the randomly initialized entity resolution model, and performing one or more entity resolution tasks by applying the trained randomly initialized entity resolution model to one or more datasets.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating a deep transfer active learning algorithm, according to an exemplary embodiment of the invention;

DETAILED DESCRIPTION

As described herein, an embodiment of the invention includes low-resource entity resolution with transfer learning. At least one embodiment includes implementing deep learning-based methodology that targets low-resource settings for ER through a combination of transfer learning and active learning.

Through a neural network architecture, one or more embodiments include learning a transferable model from multiple source datasets with cumulatively sufficient labeled data. Subsequently, such an embodiment includes using active learning to identify uncertain and thus informative examples to further adapt the model to the target dataset. This combination of transfer and active learning in ER settings enables the learning of an improved deep learning (DL) model while using significantly fewer target dataset labels in comparison to conventional approaches. Accordingly, at least one embodiment includes creating and/or implementing a DL architecture for ER that learns attribute-agnostic and transferable representations from multiple source datasets using dataset (domain) adaptation. Additionally, such an embodiment includes utilizing entropy-based sampling methods for active learning, which helps fine-tune the transferred model to a target dataset.

One or more embodiments are intended to be implemented in contexts of ER tasks in low-resource settings (i.e., wherein there is a limited amount of labeled data for the tasks). In such an embodiment, deep learning methods mitigate and/or eliminate the need for designing matching functions, and deep learning methods also alleviate the need for feature engineering (that require considerable amounts of labeled data).

Figure 1:
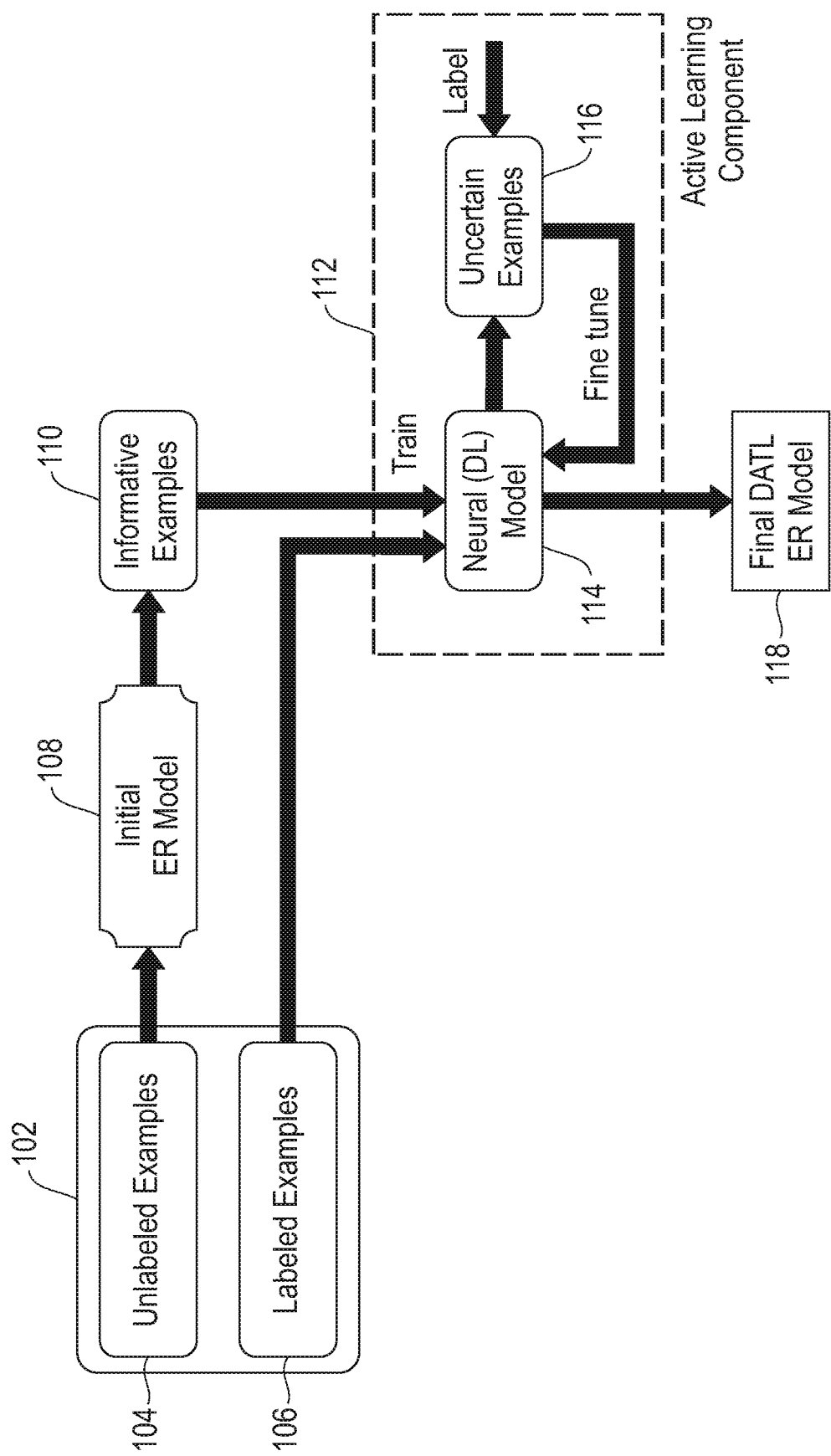
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a low-resource dataset 102 that includes a (small) collection of labeled examples 106 and a collection of unlabeled examples 104. At least a portion of the unlabeled examples 104 are provided to an initial ER model 108, which processes the provided unlabeled examples 104 and determines and/or identifies one or more informative examples 110. The informative examples 110, as well as at least a portion of the labeled examples 106, are provided to a neural (deep learning) model 114 within active learning component 112.

The neural (DL) model 114 determines and/or identifies one or more uncertain examples 116, and those uncertain examples are provided with labels (for example, via a user), and those newly-labeled examples and reincorporated into the neural (DL) model 114 to fine-tune the model 114. Additionally, as depicted in FIG. 1, the neural (DL) model 114 ultimately generate and/or output a final deep active transfer learning (DATL) ER model 118 (which can be utilized to execute one or more ER tasks).

Figure 2:
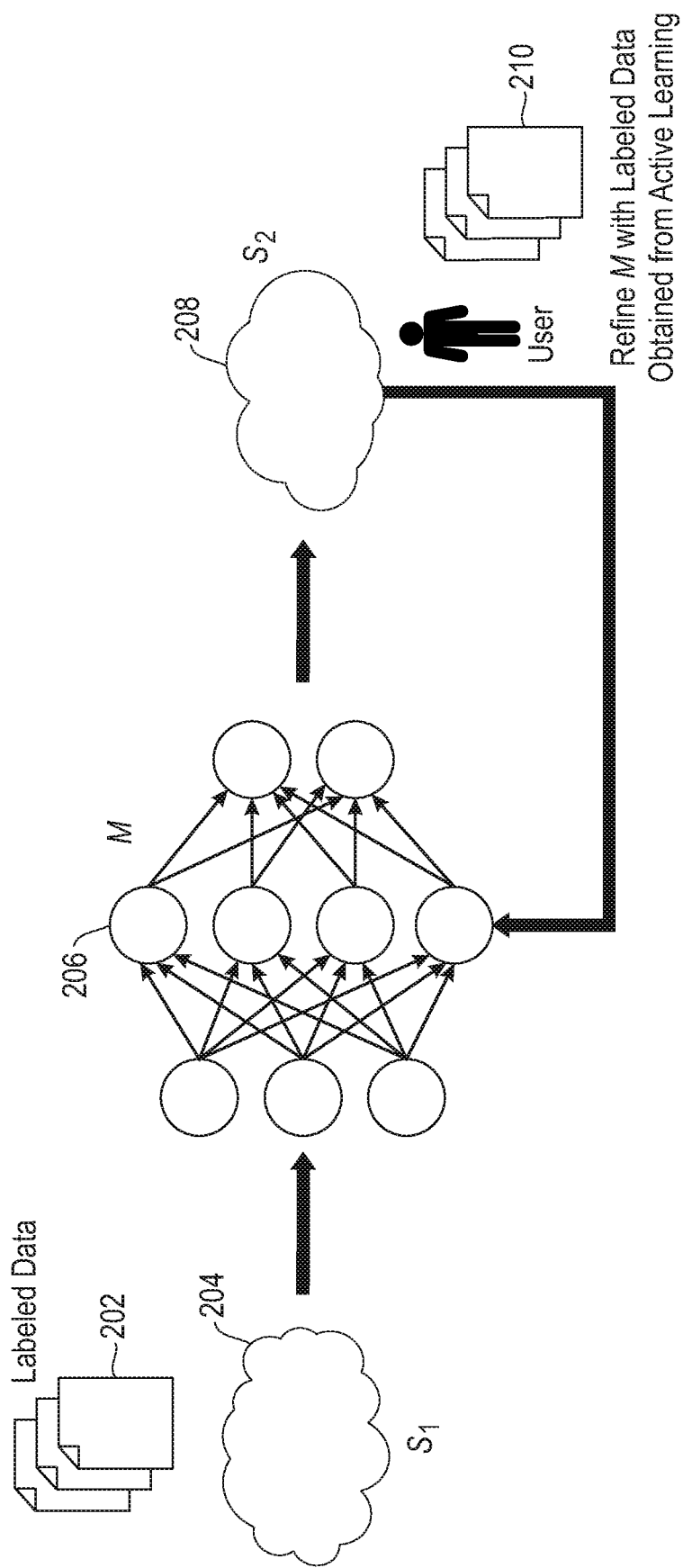
FIG. 2 is a flow diagram illustrating low-resource entity resolution with transfer learning, according to an exemplary embodiment of the invention.

FIG. 2 is a flow diagram illustrating low-resource entity resolution with transfer learning, according to an exemplary embodiment of the invention. By way of example, consider an ER scenario including a tuple (D={$D_1, D_2, \ldots, D_n$}, T), wherein D is a collection of datasets over schemas with similar attributes, and T is the task of identifying all occurrences of the same entity instances (of the same type) across D. For instance, such a task may include identifying a person that appears in multiple records in D. As noted herein, some ER scenarios include a significant amount of labeled data; however, many ER scenarios will include a limited amount of labeled data (also referred to herein as low-resource ER tasks).

Referring again to FIG. 2, given an ER scenario $S_1$ 204 including a significant amount of labeled data 202, at least one embodiment of the invention includes learning a neural (DL) ER model M 206 from $S_1$ using the same neural network for all attribute pairs. Additionally, given a target scenario $S_2$ 208, such an embodiment also includes identifying attributes among the datasets of $S_2$ 208 that are semantically similar (carried out, for example, via techniques such as scheme matching), and then applying M 206 to those attribute pairs to identify occurrences of the same entity instances across the datasets in $S_2$ 208. If there is some amount of labeled data from $S_2$ 208, such labeled data (or a portion thereof) can be used to refine the transferred model M 206 to better adapt to $S_2$ 208. As also depicted in FIG. 2, in at least one embodiment, an amount of labeled data 210 from $S_2$ 208 can be generated automatically via active learning, in which at least one active learning algorithm actively identifies relevant examples from $S_2$ 208 to be labeled by a user and used to refine the model M 206.

As detailed herein, in one or more embodiments, deep learning models use distributed representations of entity record pairs for classification. Such models leverage word embeddings to construct a vector representation of each entity record pair, and thus, are able to avoid expensive feature engineering. In at least one embodiment, deep learning ER models are similar to RNN models and also facilitate transfer learning. In such an embodiment, it is assumed that blocking has already been performed, and the deep learning ER models classify each pair in the candidate set as a match or a non-match.

For each entity record pair <$e_1, e_2$>, wherein each attribute value is a sequence of words, one or more embodiments include tokenizing the attribute values and vectorizing the words by external word embeddings to obtain input representations. By way merely of example, such an embodiment can include using 300 dimensional FastText embeddings, which capture sub-word information by producing word vectors via character n-grams.

Additionally, at least one embodiment includes running a bidirectional recurrent neural network (RNN) on the word input representations of each attribute value, and obtaining attribute vectors by concatenating the last hidden units from both directions. In one or more embodiments, different RNNs are used for different attributes. Alternatively, one or more embodiments include implementing a universal RNN that computes all attribute representations in a given network architecture. The resultant attribute representations can be used to compare attributes of each entity record pair. In particular, at least one embodiment includes computing the element-wise absolute difference between the two attribute vectors for each attribute, and constructing attribute similarity vectors.

Given the attribute similarity vectors, one or more embodiments include combining those vectors to represent the similarity between the input entity record pair. Such an embodiment includes adding and/or summing all attribute similarity vectors. This way of combining vectors ensures that the final similarity vector is of the same dimensionality regardless of the number of attributes, and facilitates transfer of all of the subsequent parameters.

Additionally, at least one embodiment includes feeding the similarity vector for the two records to a two-layer multilayer perceptron (MLP) with highway connections, and classifying the pair as a match or a non-match. The output from the final layer of the MLP is a two-dimensional vector, and one or more embodiments include normalizing the two-dimensional vector via the softmax function to obtain a probability distribution.

Also, at least one embodiment includes training one or more networks to minimize the negative log-likelihood loss. Such an embodiment can include, for example, using the Adam optimization algorithm with a batch size of 16 and an initial learning rate of 0.001, and after each epoch, such an embodiment includes evaluating the model on the development set.

As also detailed herein, one or more embodiments include deep transfer active learning for ER tasks, wherein such an embodiment includes establishing two orthogonal frameworks for deep learning ER models in low-resource settings (i.e., a transfer learning framework and an active learning framework).

With respect to transfer learning, at least one embodiment includes training all parameters in the given network on source data, and using the parameters to classify a target dataset. Such an embodiment can additionally include constructing network representations that are invariant with respect to idiosyncratic properties of datasets. To this end, one or more embodiments include applying the technique of dataset (domain) adaptation developed in image recognition. In particular, such an embodiment includes building a dataset classifier with the same architecture as the matching classifier that predicts the dataset from which the input pair originates. Also, such an embodiment replaces the training objective by the sum of the negative log-likelihood losses from the two classifiers. A gradient reversal layer can be added between the similarity vector and the dataset classifier such that the parameters in the dataset classifier are trained to predict the dataset while the rest of the network is trained to mislead the dataset classifier, thereby developing dataset-independent internal representations. With dataset adaptation, such an embodiment includes feeding pairs from the target dataset as well as the source to the network. For the pairs from the target dataset, the loss from the matching classifier can be disregarded.

Additionally, in one or more embodiments, active learning provides a framework to reduce the number of pairs that need to be labeled by iteratively selecting informative examples for the model.

FIG. 3 is a diagram illustrating a deep transfer active learning algorithm 302, according to an exemplary embodiment of the invention. Note that one or more embodiments include avoiding using entropy level thresholds to select samples, and instead include fixing the number of samples. As depicted in FIG. 3, the active learning algorithm 302 iterates over three steps: (1) selecting uncertain (and thus informative) samples from the unlabeled data and labeling such samples; (2) selecting high-confidence samples from the unlabeled data and using predicted labels as proxies; and (3) updating the parameters in the network by training the network on the selected samples. The second step, for example, prevents the network from overfitting to selected uncertain samples.

In one or more embodiments, uncertain samples and high-confidence samples are characterized by the entropy of the conditional probability distribution outputted by the current model. By way merely of illustration, let K be the sampling size and the unlabeled dataset including candidate record pairs be $D^U = \{x_i\}_{i=1}^N$. Additionally, denote the probability that record pair $x_i$ is a match according to the current model by $p(x_i)$. Subsequently, the conditional entropy of the pair is computed via the following equation:

$$H(x_i) = -p(x_i)\log p(x_i) - (1-p(x_i))\log(1-p(x_i))$$

Uncertain samples and high-confidence samples can be associated with high and low entropy. Given this notion of uncertainty and high confidence, record pairs with top K entropy can be selected as uncertain samples and those with bottom K entropy can be selected as high confidence samples. Namely, take $$\operatorname*{argmax}_{D \subseteq D^U s.t. |D|=K} \sum_{x \in D} H(x), \quad \operatorname*{argmin}_{D \subseteq D^U s.t. |D|=K} \sum_{x \in D} H(x)$$

as sets of uncertain and high-confidence samples, respectively. However, these criteria can introduce an intended bias toward a certain direction, resulting in unstable performance. To address this instability problem, at least one embodiment includes implementing a partition sampling mechanism. Such an embodiment includes partitioning the unlabeled data $D^U$ into two subsets, $\tilde{D}^U$ and $\underline{D}^U$, that comprise pairs that the model predicts as matches and non-matches, respectively. Namely, $\tilde{D}^U = \{x \in D^U | p(x) \geq 0.5\}$, $\underline{D}^U = \{\in D^U | p(x) \geq 0.5\}$.

Subsequently, such an embodiment includes selecting the top/bottom k=K/2 samples from each subset with respect to entropy. Uncertain samples are now:

$$\operatorname*{argmax}_{D \subseteq \tilde{D}^U s.t. |D|=k} \sum_{x \in D} H(x), \quad \operatorname*{argmax}_{D \subseteq \underline{D}^U s.t. |D|=k} \sum_{x \in D} H(x),$$

wherein the two criteria select likely false positives (to enhance precision) and likely false negatives (to enhance recall), respectively. In such an embodiment, high-confidence samples are identified by:

$$\operatorname*{argmin}_{D \subseteq \tilde{D}^U s.t. |D|=k} \sum_{x \in D} H(x), \quad \operatorname*{argmin}_{D \subseteq \underline{D}^U s.t. |D|=k} \sum_{x \in D} H(x),$$

wherein the two criteria correspond to high-confidence positives and high-confidence negatives, respectively. These sampling criteria equally partition uncertain samples and high-confidence samples into different categories.

Figure 4:
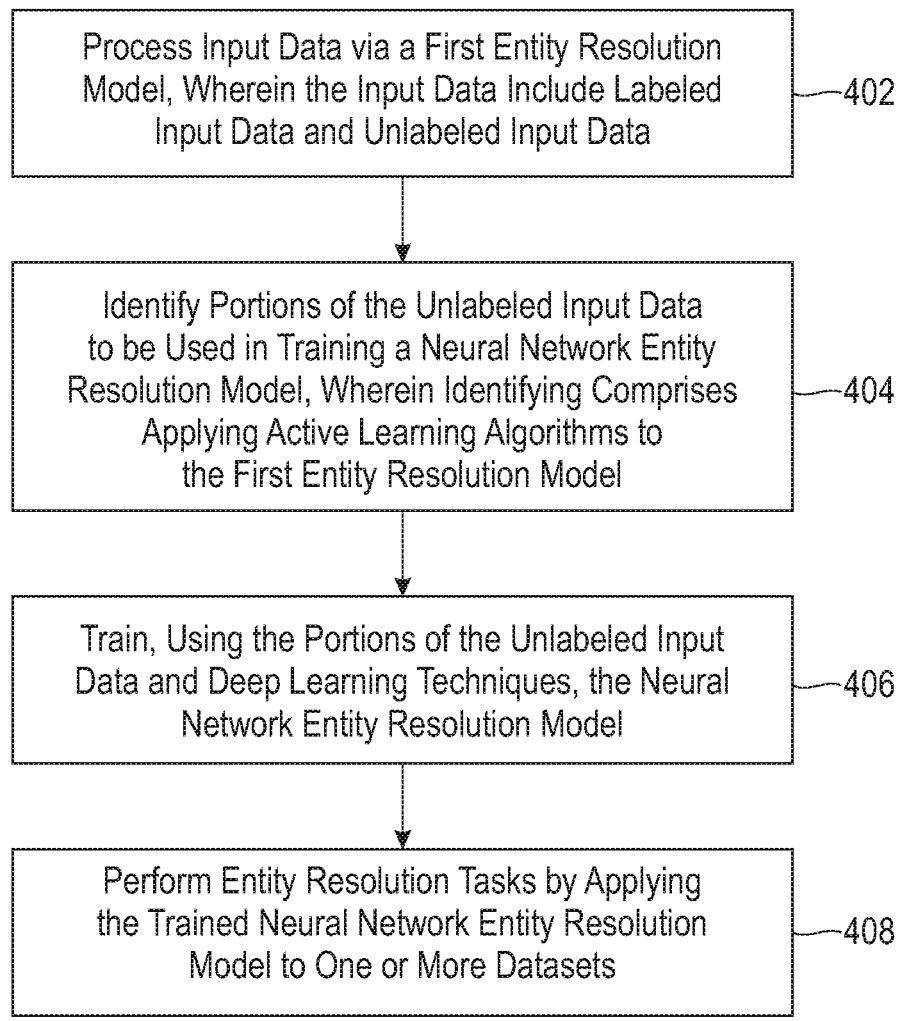
FIG. 4 is a flow diagram illustrating techniques according to an embodiment of the invention.

FIG. 4 is a flow diagram illustrating techniques according to an embodiment of the present invention. Step 402 includes processing input data via a first entity resolution model, wherein the input data comprise labeled input data and unlabeled input data. Step 404 includes identifying one or more portions of the unlabeled input data to be used in training a neural network entity resolution model, wherein said identifying comprises applying one or more active learning algorithms to the first entity resolution model.

Step 406 includes training, using (i) the one or more portions of the unlabeled input data and (ii) one or more deep learning techniques, the neural network entity resolution model. In at least one embodiment, the one or more deep learning techniques include implementing distributed representations of entity record pairs for classification, and training the neural network entity resolution model includes constructing a vector representation of each of the entity record pairs by leveraging word embeddings.

Step 408 includes performing one or more entity resolution tasks by applying the trained neural network entity resolution model to one or more datasets. In one or more embodiments, the one or more datasets include an amount of labeled data less than a given threshold. Additionally, in at least one embodiment, the trained neural network entity resolution model includes a recurrent neural network model.

The techniques depicted in FIG. 4 can also include fine-tuning the neural network entity resolution model by labeling, via manual input, one or more uncertain portions of the processed input data. Additionally, at least one embodiment includes generating the first entity resolution model by training, via one or more deep learning techniques, a neural network model with labeled input data. Also, in such an embodiment, the one or more deep learning techniques including learning the attribute-agnostic and transferable neural network model from multiple source datasets using dataset adaptation.

Also, an additional embodiment of the invention includes processing input data via a randomly initialized entity resolution model, wherein the input data include unlabeled input data, and identifying one or more portions of the unlabeled input data to be used in training the randomly initialized entity resolution model, wherein identifying includes applying one or more active learning algorithms to the randomly initialized entity resolution model. Additionally, such an embodiment includes training, using (i) the one or more portions of the unlabeled input data and (ii) one or more deep learning techniques, the randomly initialized entity resolution model, and performing one or more entity resolution tasks by applying the trained randomly initialized entity resolution model to one or more datasets.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
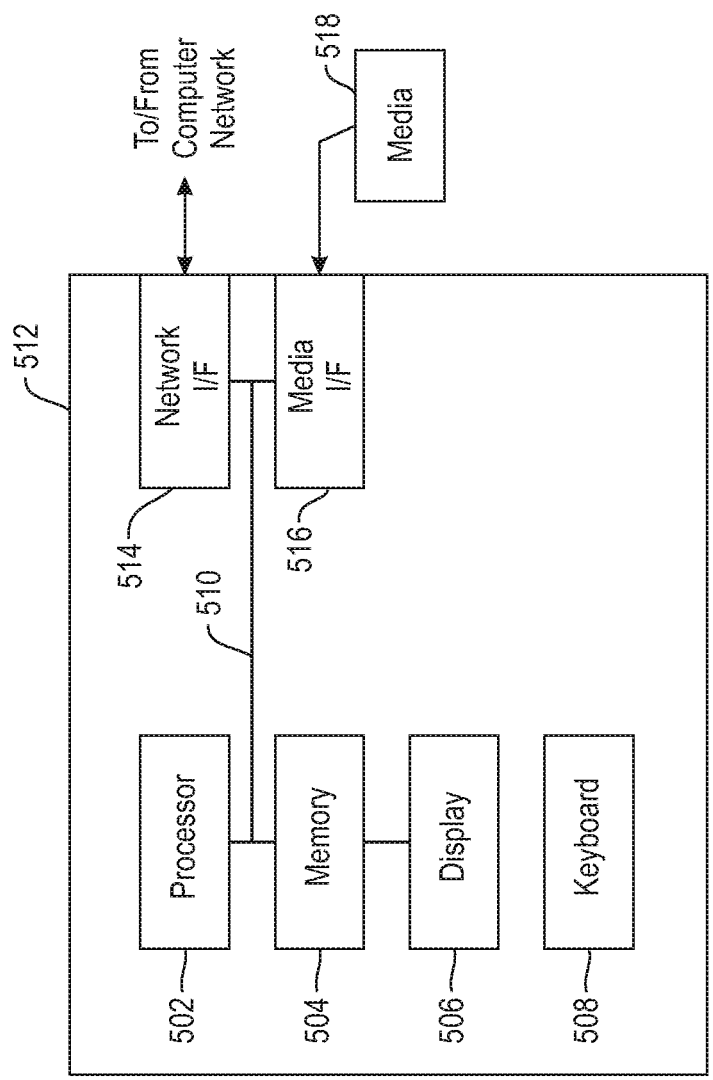
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
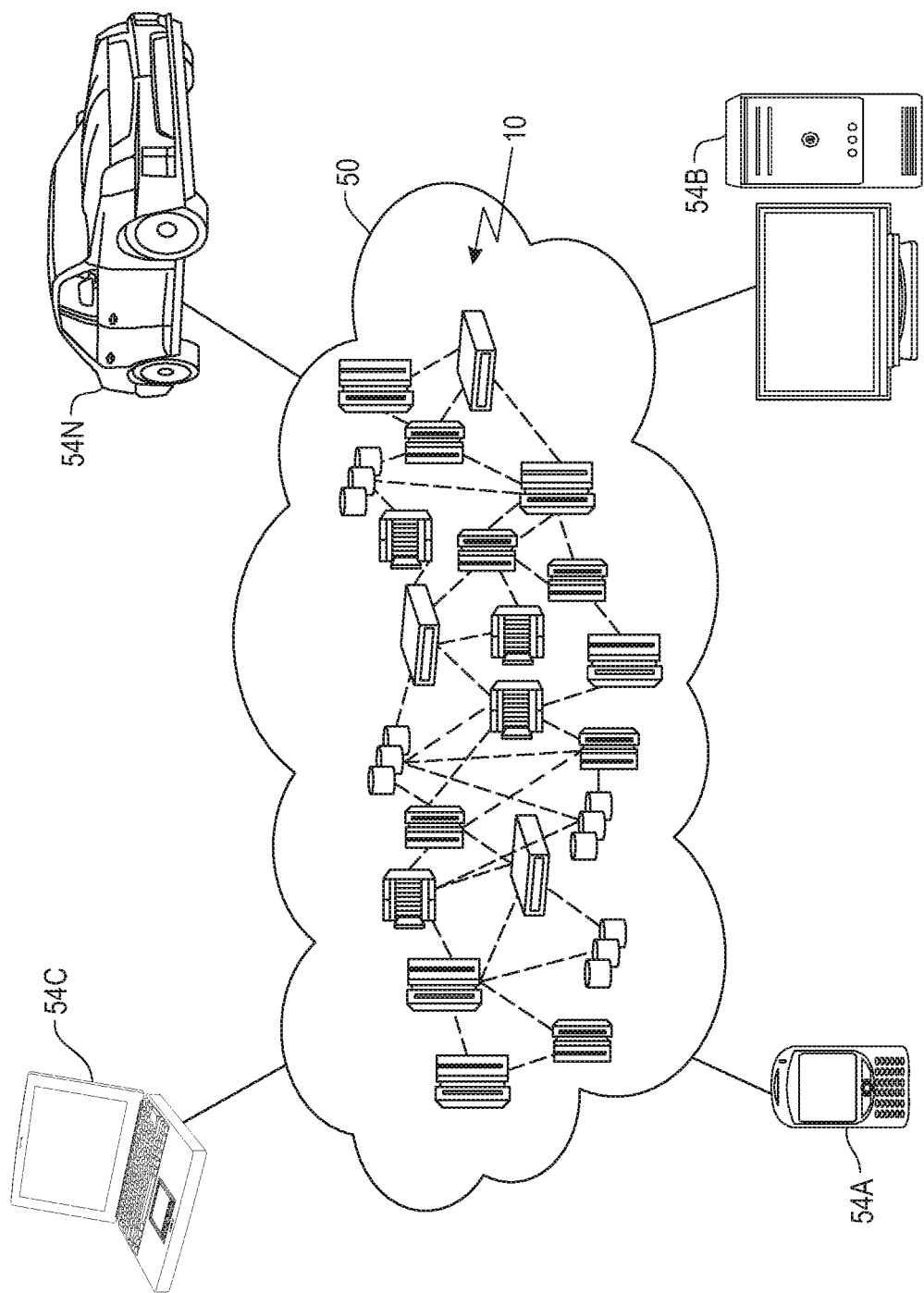
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
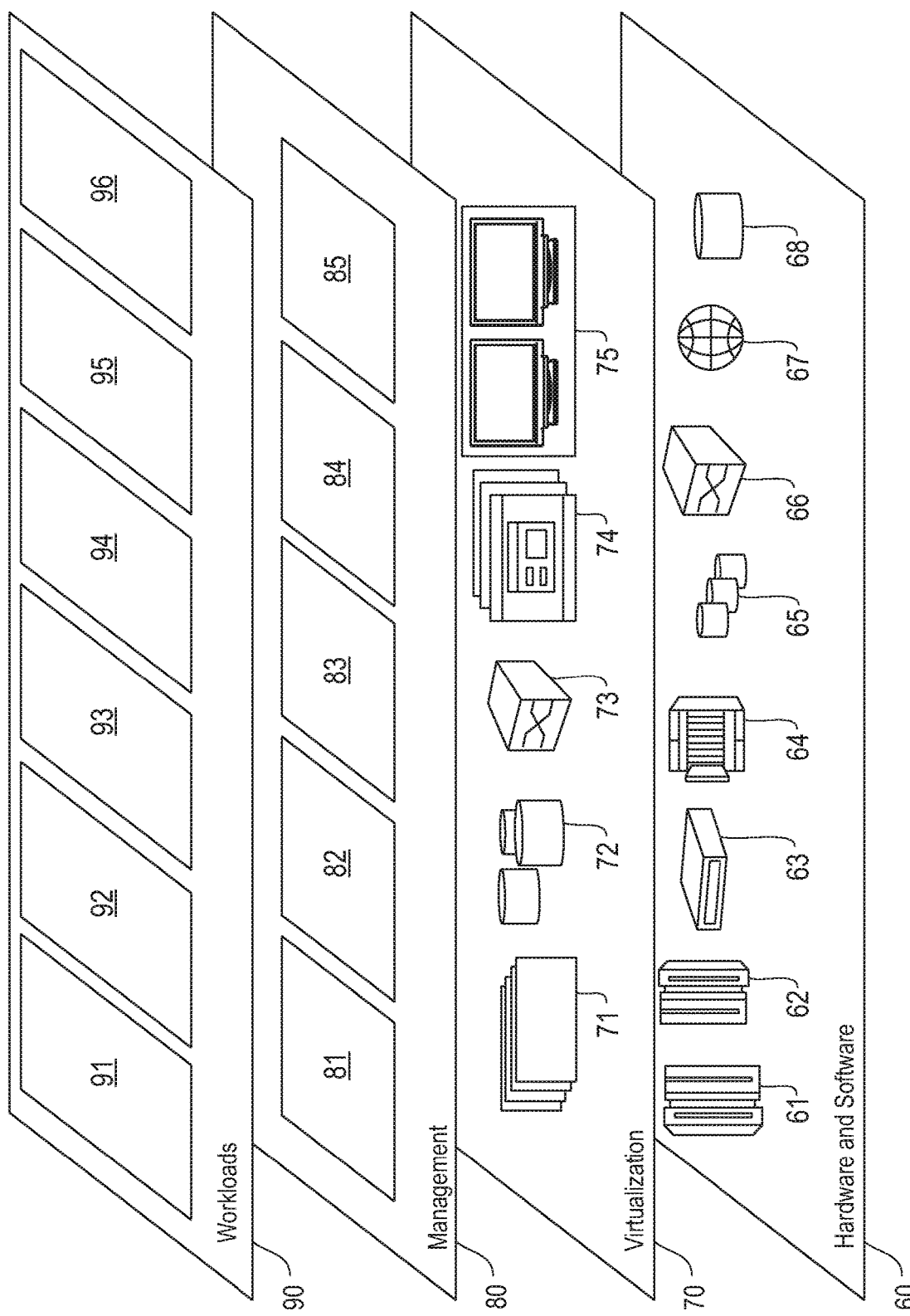
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and low-resource entity resolution 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, performing entity resolution tasks in low-resource contexts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining input data in connection with a first entity resolution model, wherein the input data comprise labeled input data and unlabeled input data;
    identifying a section of the unlabeled input data to be used in training a neural network entity resolution model, wherein said identifying comprises implementing one or more active learning algorithms in connection with the first entity resolution model, and wherein implementing the one or more active learning algorithms comprises partitioning the unlabeled input data into two or more subsets using at least one partition sampling mechanism, and selecting, as the section of the unlabeled input data to be used in training the neural network entity resolution model, one or more portions of the unlabeled input data from each of the two or more subsets based at least in part on entropy values assigned to the unlabeled input data;
    training, using (i) the section of the unlabeled input data and (ii) one or more deep learning techniques, the neural network entity resolution model, wherein using the one or more deep learning techniques comprise implementing one or more distributed representations of entity record pairs for classification; and
    performing one or more entity resolution tasks by applying the trained neural network entity resolution model to one or more datasets;
    wherein the method is carried out by at least one computing device.

2. The computer-implemented method of claim 1, wherein the one or more datasets comprise an amount of labeled data less than a given threshold.

3. The computer-implemented method of claim 1, wherein said training the neural network entity resolution model comprises constructing a vector representation of each of the entity record pairs by leveraging word embeddings.

4. The computer-implemented method of claim 1, wherein the trained neural network entity resolution model comprises a recurrent neural network model.

5. The computer-implemented method of claim 1, comprising:
    fine-tuning the neural network entity resolution model by labeling, via manual input, one or more uncertain portions of the processed input data.

6. The computer-implemented method of claim 1, comprising:
    generating the first entity resolution model by training, via one or more deep learning techniques, a neural network model with labeled input data.

7. The computer-implemented method of claim 6, wherein the one or more deep learning techniques comprise learning an attribute-agnostic and transferable neural network model from multiple source datasets using dataset adaptation.

8. The computer-implemented method of claim 1, wherein software implementing the method is provided as a service in a cloud environment.

9. A computer program product comprising a computer readable storage medium having program instructions embodied therewith, the program instructions executable by a computing device to cause the computing device to:
    obtain input data in connection with a first entity resolution model, wherein the input data comprise labeled input data and unlabeled input data;
    identify a section of the unlabeled input data to be used in training a neural network entity resolution model, wherein said identifying comprises implementing one or more active learning algorithms in connection with the first entity resolution model, and wherein implementing the one or more active learning algorithms comprises partitioning the unlabeled input data into two or more subsets using at least one partition sampling mechanism, and selecting, as the section of the unlabeled input data to be used in training the neural network entity resolution model, one or more portions of the unlabeled input data from each of the two or more subsets based at least in part on entropy values assigned to the unlabeled input data;
    train, using (i) the section of the unlabeled input data and (ii) one or more deep learning techniques, the neural network entity resolution model, wherein using the one or more deep learning techniques comprise implementing one or more distributed representations of entity record pairs for classification; and
    perform one or more entity resolution tasks by applying the trained neural network entity resolution model to one or more datasets.

10. The computer program product of claim 9, wherein said training the neural network entity resolution model comprises constructing a vector representation of each of the entity record pairs by leveraging word embeddings.

11. The computer program product of claim 9, wherein the trained neural network entity resolution model comprises a recurrent neural network model.

12. The computer program product of claim 9, wherein the program instructions executable by a computing device further cause the computing device to:

fine-tune the neural network entity resolution model by labeling, via manual input, one or more uncertain portions of the processed input data.

13. The computer program product of claim 9, wherein the program instructions executable by a computing device further cause the computing device to:
generate the first entity resolution model by training, via one or more deep learning techniques, a neural network model with labeled input data.

14. A system comprising:
a memory; and
at least one processor operably coupled to the memory and configured for:
obtaining input data in connection with a first entity resolution model, wherein the input data comprise labeled input data and unlabeled input data;
identifying a section of the unlabeled input data to be used in training a neural network entity resolution model, wherein said identifying comprises implementing one or more active learning algorithms in connection with the first entity resolution model, and wherein implementing the one or more active learning algorithms comprises partitioning the unlabeled input data into two or more subsets using at least one partition sampling mechanism, and selecting, as the section of the unlabeled input data to be used in training the neural network entity resolution model, one or more portions of the unlabeled input data from each of the two or more subsets based at least in part on entropy values assigned to the unlabeled input data;
training, using (i) the section of the unlabeled input data and (ii) one or more deep learning techniques, the neural network entity resolution model, wherein using the one or more deep learning techniques comprise implementing one or more distributed representations of entity record pairs for classification; and
performing one or more entity resolution tasks by applying the trained neural network entity resolution model to one or more datasets.

15. A computer-implemented method, the method comprising:
processing input data via a randomly initialized entity resolution model, wherein the input data comprise unlabeled input data;
identifying a section of the unlabeled input data to be used in training the randomly initialized entity resolution model, wherein said identifying comprises implementing one or more active learning algorithms in connection with the randomly initialized entity resolution model, and wherein implementing the one or more active learning algorithms comprises partitioning the unlabeled input data into two or more subsets using at least one partition sampling mechanism, and selecting, as the section of the unlabeled input data to be used in training the randomly initialized entity resolution model, one or more portions of the unlabeled input data from each of the two or more subsets based at least in part on entropy values assigned to the unlabeled input data;
training, using (i) the section of the unlabeled input data and (ii) one or more deep learning techniques, the randomly initialized entity resolution model, wherein using the one or more deep learning techniques comprise implementing one or more distributed representations of entity record pairs for classification; and
performing one or more entity resolution tasks by applying the trained randomly initialized entity resolution model to one or more datasets;
wherein the method is carried out by at least one computing device.

16. The computer-implemented method of claim 15, wherein the trained randomly initialized entity resolution model comprises a recurrent neural network model.

* * * * *